(12) United States Patent
Tepus

(10) Patent No.: US 9,384,117 B2
(45) Date of Patent: Jul. 5, 2016

(54) MACHINE AND METHODS FOR EVALUATING FAILING SOFTWARE PROGRAMS

(71) Applicant: Infineon Technologies AG, Neubiberg (DE)

(72) Inventor: Cristian Tepus, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 286 days.

(21) Appl. No.: 13/783,004

(22) Filed: Mar. 1, 2013

(65) Prior Publication Data

US 2014/0250336 A1    Sep. 4, 2014

(51) Int. Cl.
*G06F 11/00* (2006.01)
*G06F 11/36* (2006.01)

(52) U.S. Cl.
CPC .................................. *G06F 11/3636* (2013.01)

(58) Field of Classification Search
CPC ............ H04L 25/0202; H04L 25/0204; H04L 25/03006; H04L 25/03057
USPC ................. 714/41, 11, 38.1; 717/124; 703/14
See application file for complete search history.

(56) References Cited

U.S. PATENT DOCUMENTS

| | | | |
|---|---|---|---|
| 5,761,510 A * | 6/1998 | Smith et al. ..................... | 717/124 |
| 8,000,930 B2 * | 8/2011 | Poncet et al. .................. | 702/181 |
| 8,788,875 B2 * | 7/2014 | Gerhart ............................ | 714/4.4 |
| 2002/0144184 A1 * | 10/2002 | Anvin ................. | G06F 11/0721 714/38.13 |
| 2004/0117772 A1 * | 6/2004 | Brand et al. ................... | 717/132 |
| 2004/0139304 A1 * | 7/2004 | Arimilli ................ | G06F 9/3802 712/226 |
| 2005/0108781 A1 * | 5/2005 | Ohto ......................... | A01H 1/04 800/8 |
| 2005/0159690 A1 * | 7/2005 | Barak .................. | A61H 9/0078 601/149 |
| 2005/0188264 A1 * | 8/2005 | Luick ..................... | G06F 11/079 714/26 |
| 2007/0168761 A1 * | 7/2007 | Baltes ................ | G05B 19/0426 714/51 |
| 2009/0249301 A1 * | 10/2009 | Kalla et al. ..................... | 717/127 |
| 2010/0083203 A1 * | 4/2010 | Bose et al. ........................ | 716/6 |
| 2011/0258602 A1 * | 10/2011 | Ndem et al. .................. | 717/124 |
| 2013/0096902 A1 * | 4/2013 | Bose et al. ....................... | 703/14 |
| 2013/0231895 A1 * | 9/2013 | Zhu .............................. | 702/183 |

FOREIGN PATENT DOCUMENTS

| | | |
|---|---|---|
| CN | 102541737 A | 7/2012 |
| CN | 102750220 A | 10/2012 |

\* cited by examiner

*Primary Examiner* — Bryce Bonzo
*Assistant Examiner* — Jeison C Arcos
(74) *Attorney, Agent, or Firm* — Slater Matsil, LLP

(57) ABSTRACT

A machine for evaluating failing software programs, a non-transitory computer-readable storage medium with an error analysis program stored thereon and an error analysis program executed by a microprocessor are disclosed. In one embodiment a machine for investigating an error source in a software program includes a microprocessor coupled to a memory, wherein the microprocessor is programmed to determine whether a failure of an error-prone program step occurs reproducibly by providing the software program with the error-prone program step, executing program steps preceding the error-prone program step, executing the error-prone program step a number of times and calculating a failure probability for the error-prone program step.

8 Claims, 8 Drawing Sheets

US 9,384,117 B2

MACHINE AND METHODS FOR EVALUATING FAILING SOFTWARE PROGRAMS

TECHNICAL FIELD

The present invention relates to a machine and methods usable for software program error analysis in general, and test evaluation program error analysis in particular.

BACKGROUND

Software programs comprising multiple program steps, running either automatically in consecutive order or being initiated by user instructions, have become a common work tool. Such software programs may, for example, facilitate administrative tasks or allow effective quality control of manufactured goods, such as electronic devices. However, software programs may fail during initial application trials for often unknown reasons. Modified or newly developed software programs are in particular prone to such failures. The search for the root cause of one or more errors in a multi-step software program may be a complex and time-consuming task.

SUMMARY OF THE INVENTION

In accordance with an embodiment of the invention a machine for investigating an error source in a software program comprises a microprocessor coupled to a memory, wherein the microprocessor is programmed to determine whether a failure of an error-prone program step occurs reproducibly by providing the software program with the error-prone program step, executing program steps preceding the error-prone program step, executing the error-prone program step a number of times and calculating a failure probability for the error-prone program step.

In accordance with an embodiment of the invention a machine for investigating an error source in a software program comprises a microprocessor coupled to a memory, wherein the microprocessor is programmed to determine whether a failure of an error-prone program step occurs reproducibly by providing a multi-step sequence ending in the error-prone program step, executing the multi-step sequence a number of times and calculating a failure probability for the multi-step sequence.

In accordance with an embodiment of the invention a machine for investigating an error source in a software program comprises a microprocessor coupled to a memory, wherein the microprocessor is programmed to determine the error source for an error-prone program step by providing a first set of multi-step sequences ending in the error-prone program step, executing each multi-step sequence of the first set of multi-step sequences and recording every failed step sequence in the memory.

In accordance with an embodiment of the invention a machine for investigating an error source in a software program comprising a microprocessor coupled to a memory, wherein the microprocessor is programmed to determine the error source for an error-prone program step by providing a set of multi-step sequences ending in the error-prone program step, wherein the set of multi-step sequences comprises different multi-step sequences, and each of the multi-step sequences differ from another multi-step sequence by omission of a step, executing each multi-step sequence of the multi-step sequences and recording the missing step when a multi-step sequence fails.

In accordance with an embodiment of the invention a machine for investigating an error source in a software program comprises a microprocessor coupled to a memory, wherein the microprocessor is programmed to determine the error source for an error-prone program step by providing a set of failing sequences all ending in the same error-prone program step, analyzing the failing sequences regarding a plurality of program steps common to the failing sequences; and ranking the plurality of program steps according a failure probability.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Software programs (also referred herein as multi-step programs) may comprise a sequence of steps, each of them comprising an instruction step and a verification step to check whether the given instruction step has indeed been carried out in a timely and correct manner. Software programs may fail during operation due to software programming errors or hardware failures. Newly developed or modified software programs are in particular prone having errors which generally become apparent during an initial period of application. In case the multi-step program fails, it may be a difficult and tedious task for the program developer to "debug" the software program, e.g., to track down the exact error source(s). Rather often there are no hints which individual program step or group of program steps caused the failure. Moreover, it may be unclear whether the observed error was created by cache coherence issues or by asynchronous timing of program steps. Finally, it may be unclear whether and under which conditions the error occurred in reproducible fashion. Investigations searching for error sources of the software program are typically carried out manually, e.g., without the help of an auxiliary software program (e.g., an error analysis program).

Embodiments of the present invention provide an error analysis program for fast identification of root causes of errors or a software program. Various embodiments of the present invention provide boundary conditions under which an identified software program failure occurs reproducibly. Various embodiments of the present invention provide a determination of what may cause the error. Embodiments of the invention may be applied to any software program with distinct and individual program steps.

Embodiments may further comprise a machine for evaluating failing software programs, a non-transitory computer-readable storage medium with an error analysis program stored thereon and an error analysis program executed by a microprocessor.

Figure 1:
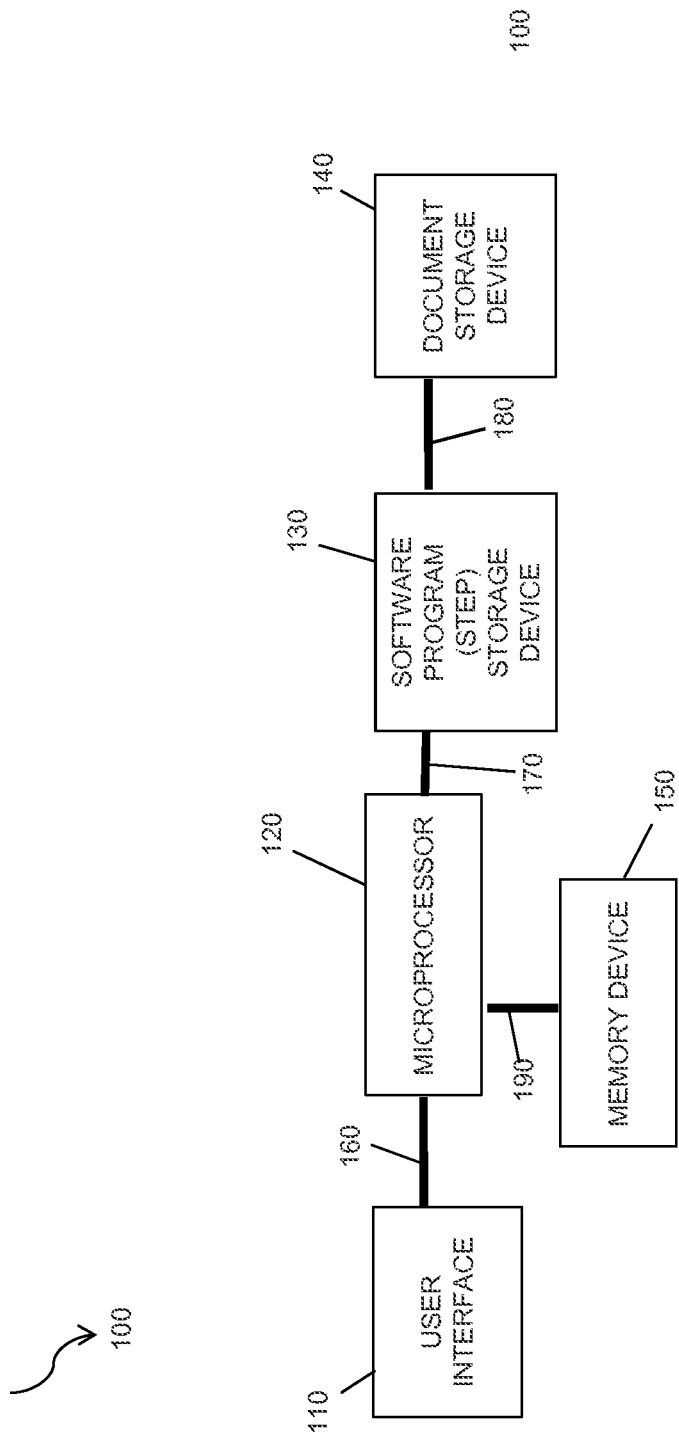
FIG. 1 shows a block diagram of a machine for evaluating failing software programs.

FIG. 1 shows a block diagram of a machine 100 enabling the analysis of failing software programs. The machine 100 comprises a user interface 110, a microprocessor 120, a device 130 for storing software programs (e.g., multi-step programs) or individual program steps, a document storage device 140, and a memory device 150. Furthermore the machine 100 comprises various electrical connections and/or buses 160, 170, 180, 190 establishing electrical connectivity between the above mentioned sub-systems of the machine 100.

The user interface 110 is configured to provide instructions with respect to an error analysis program (also referred herein as error investigation program) in operation, and configured to output results or responses provided by various evaluation algorithms of the error analysis program. The microprocessor 120 is configured to carry out and process the algorithms. The memory device 150 is configured to provide temporary or permanent storage of the error analysis program. The software program storage device 130 is configured to store already executed or newly designed software programs and individual steps of multi-step software programs. The document storage device 140 is configured to store results derived from error investigation runs (e.g., test failure statistics). Optionally, either the software program storage device 130 or the document storage device 140, or both, may comprise a monitor allowing data viewing without dependence on the user interface 110 monitor. The memory device 150, the software program storage device 140 and the document storage device 130 can be a single device, such as a memory.

Embodiments of the invention relate to methods for investigating software program errors and error patterns. The disclosed algorithms may be applied to generic software programs or to test programs, e.g., programs testing generic software programs. For example, the software program or the test program may be a program for designing chips in the semiconductor industry.

Figure 2:
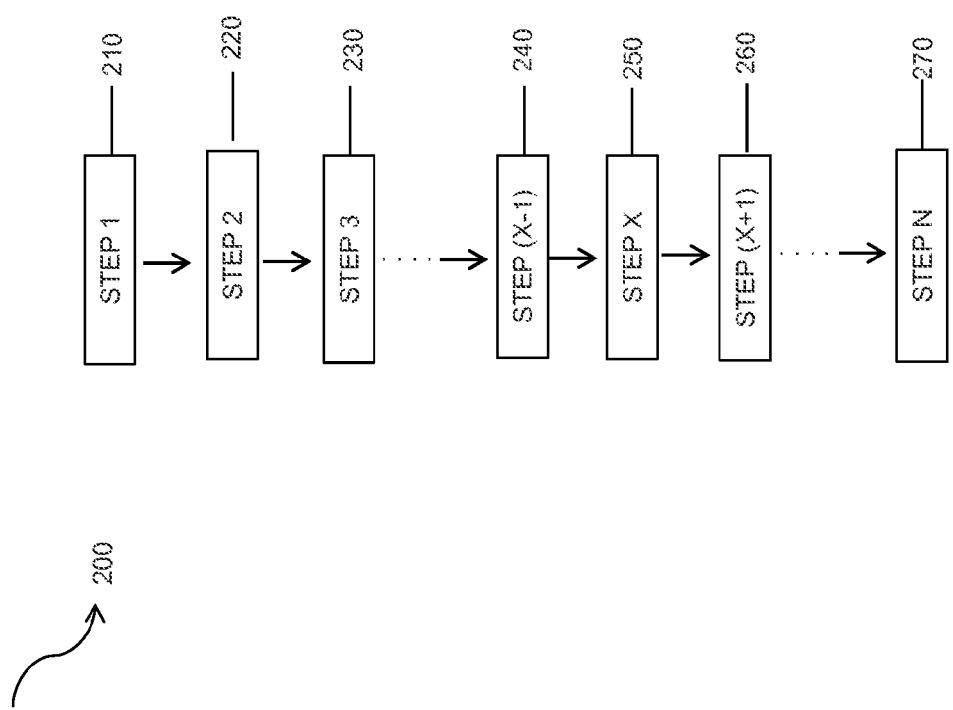
FIG. 2 shows a generic failing software program comprising multiple steps.

FIG. 2 shows a software program 200 comprising a sequence of N individual program steps. For example, a first program step, Step 1 210, a final program step, Step N 270, and a specific program step, Step X 250 which is assumed to be the program step at which an error occurs. In one embodiment the software program 200 comprises merely two steps. Alternatively, the software program may comprise 10-50 steps, 10-100 steps or more than hundred steps.

The program step may be a single instruction or a group of instructions. In various embodiments the program (or test) execution step is what the user defines to be an operation. For a first example of a Graphic User Interface (GUI): 1) Open application=>Check if the window is open; 2) Open a text file=>check the editor if window contains the text file; 3) Edit new chars=>Check the editor if window is updated by the new chars. For a second example of a debugger: 1) Go into debug mode for an executable=>check if the PC is at start-up point; 2) Do a step over=>check if the PC is incremented; 3) Do a step over a function=>Check if the stack crawl is updated by the new frame. For a third example of an assembler: 1) Move location content into a register=>check if the register update; 2) Push the register into the stack=>check if the stack pointer update; 3) Add two register and put the result in register 3=>Check the register 3 for the sum.

Figure 3:
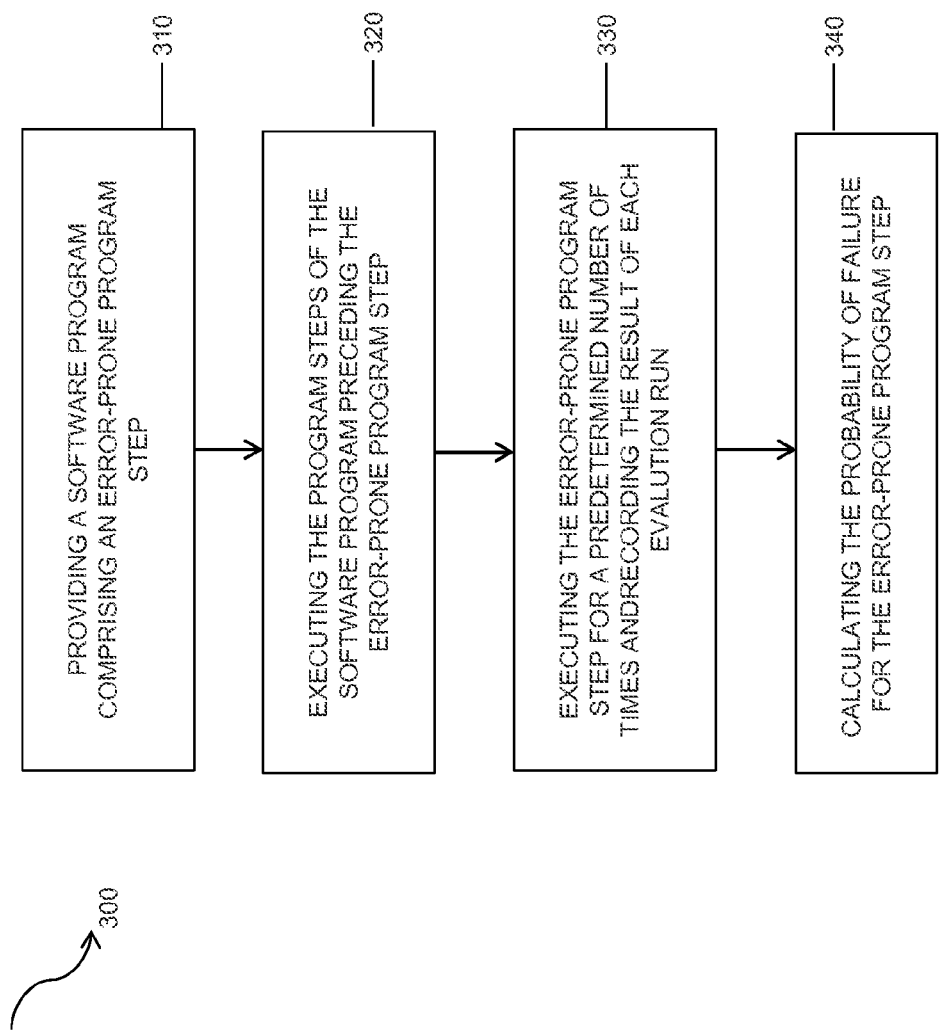
FIG. 3 shows a flowchart of an error analysis program according to an embodiment of the invention, the error analysis program comprises a method for determining whether or not a failing program step occurs reproducibly.

FIG. 3 shows a flowchart 300 of an error analysis program according to an embodiment of the invention. The error analysis program comprising a method for determining whether or not a failing program step (e.g., Step X 250) occurs reproducibly. In a first step 310 a software program (e.g., software program 200) with an error-prone program step (e.g., Step X 250) is provided. In step 320 the program steps of the software program preceding the failing program step (e.g., Step X 250) are executed. For example, Step 1 210 to Step (X–1) 240 prior to the failing program Step X 250 of the program 200 are executed. Subsequently, in step 330, the error-prone program step, Step X 250, is executed in a repetitive manner for a predetermined number of times. The outcome of every individual investigation run is recorded (e.g., in the document storage device 140). Finally, in step 340, the probability of failure for the error-prone program step, e.g., Step X 250 is calculated. The probability of failure of the error-prone program step is calculated by dividing the number of failed runs by the total number of runs.

Figure 4:
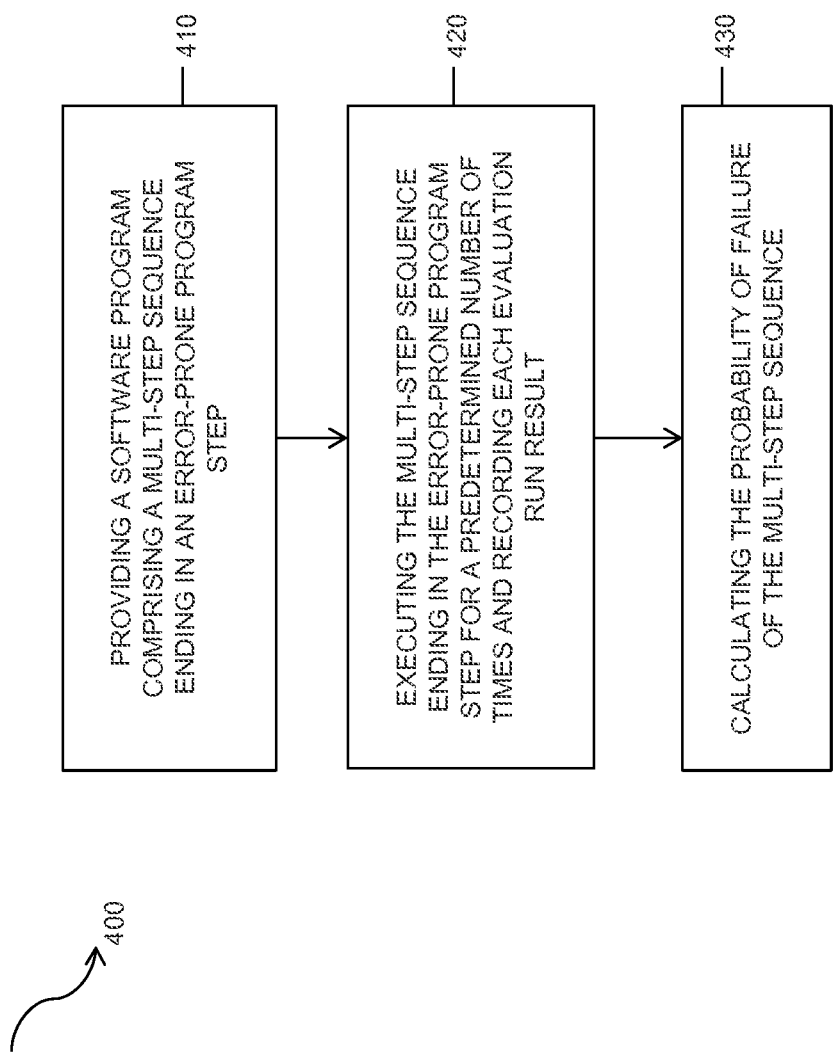
FIG. 4 shows a flowchart of an error analysis program according to an embodiment of the invention, the error analysis program comprises a method for determining whether or not a sequence of program steps up to an error-prone program step occurs reproducibly.

FIG. 4 shows a flowchart 400 of an error analysis program according to an embodiment. The error analysis program comprises a method for evaluating whether or not a reproducible error is observed while executing a multi-step sequence under the same test scenario. In a starting step 410 a software program comprising a multi-step sequence ending in an error-prone program step (e.g., Step X 250) is provided. In step 420 this multi-step sequence is executed for a predetermined number of times and the result of each evaluation run is recorded. In step 430 the probability of failure of the multi-step sequence is calculated by dividing the number of failed runs by the total number of runs. The probability of failure can be very low because a bug may be very hard to catch due to other asynchronous processes that might hide the bug most of the time, for example.

Knowledge which program step preceding a failing step of a faulty software program may trigger the error in the error-prone program step (e.g., Step X 250) may be helpful when searching for the root cause of the problem. It may be of interest to know whether other program steps than those preceding the error-prone program step (e.g., Step X 250) in the failing program may cause similar problems.

Figure 5:
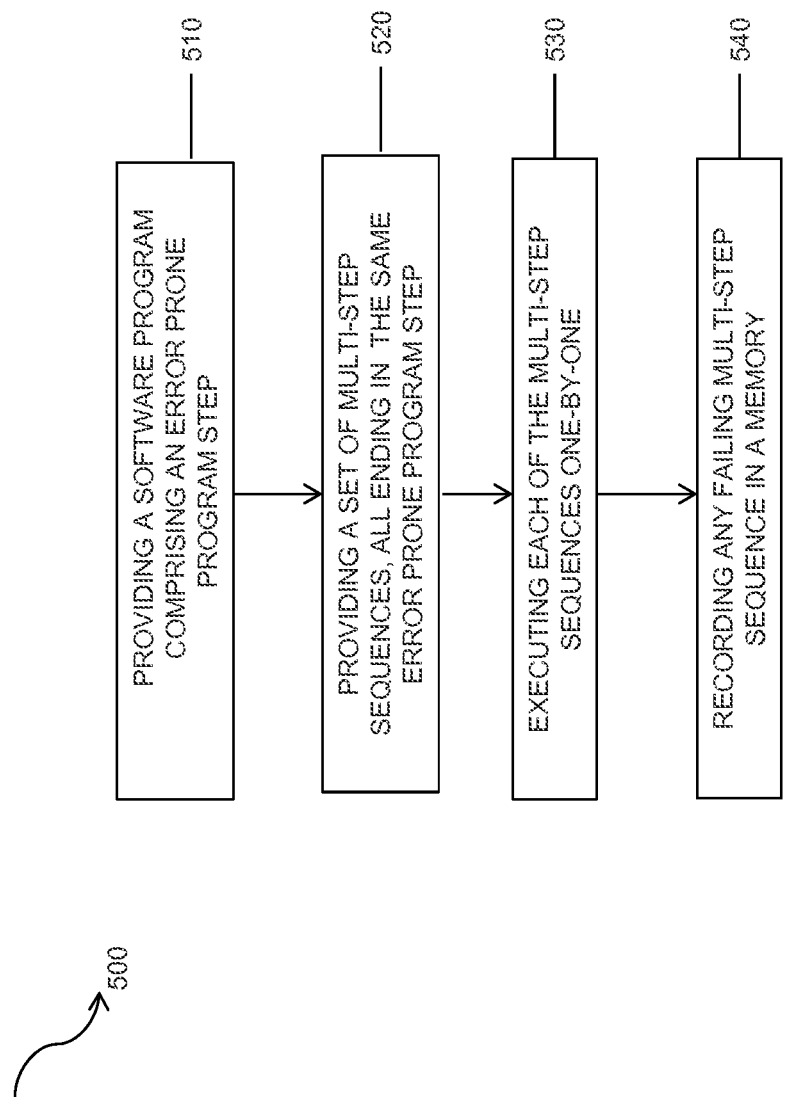
FIG. 5 shows a flowchart of an error analysis program according to an embodiment of the invention, the error analysis program comprises a method for analyzing the performance of an error-prone program step when prior program steps vary.

FIG. 5 shows a flowchart 500 of an error analysis program according to yet another embodiment. This embodiment tries to determine what the cause of the error is. In step 510 a software program comprises an error-prone program step (e.g., Step X 250) is provided. In step 520 a set of multi-step sequences, all of them ending in the same error-prone program step (e.g., Step X 250) of the faulty software program are provided. Each of the multi-step sequences may comprise one or more steps preceding the error-prone program step. The multi-step sequence set may further comprise alternative program steps which are not part of the faulty software program. For example, alternative program steps may be taken from other or next generation software programs. In step 530 a series of evaluation runs is carried out wherein each of the multi-step sequences is executed. Finally, in step 540 the failing sequences are recorded in a memory, e.g., document storage device 140.

The set of multi-step sequences provided in step 520 may differ in all or only in some of the individual steps preceding the error-prone program step. The results (form step 530) may provide information whether a particular step or particular steps (or set of steps) precede the error-prone program step in order to produce the error. The results may further provide information whether particular steps are present for all evaluation runs. Moreover, the results may provide information whether some steps are more relevant than others, e.g., whether some steps do not have an influence the failing of the error-prone program step. Finally, the results may provide information whether there is a minimal set of steps for which the error-prone program step always fails.

Cumulatively or alternatively, in some embodiments the sets of the multi-step sequences comprise the same steps but the execution order of the steps are different. The results of this error evaluation method may provide information in what cases the execution order influences the occurrence of the software program errors (or the error-prone program steps).

In various embodiments it is important to know whether a certain step preceding an error-prone program step of a software program may be a potential cause of the program failure. In various other embodiments it may be equally important to know whether a particular preceding step can be eliminated as a potential error source. The latter topic is addressed by yet another embodiment of the invention, illustrated in flowchart 600 shown in FIG. 6.

In the initial step 610 a set of j multi-step sequences $FTS_1$, $FTS_2$, $FTS_3$, ..., $FTS_j$, all of them ending in an identical error-prone program step, are provided. In step 620 for each group ($FTS_i$) a series of evaluation runs is carried out or executed. If the $FTS_i$ comprises m program steps, then the corresponding evaluation runs comprise m runs wherein in each run the program steps of the selected $FTS_i$ are executed except of one particular step so that the evaluation runs differ from run to run. In case an evaluation run fails, the program step omitted in that specific run is recorded in a register. Once all evaluation runs for all FTSs are completed, the register will comprise a list of all program steps in the evaluated FTSs which are not relevant for the failure of the error-prone program step common to all FTSs.

Figure 7:
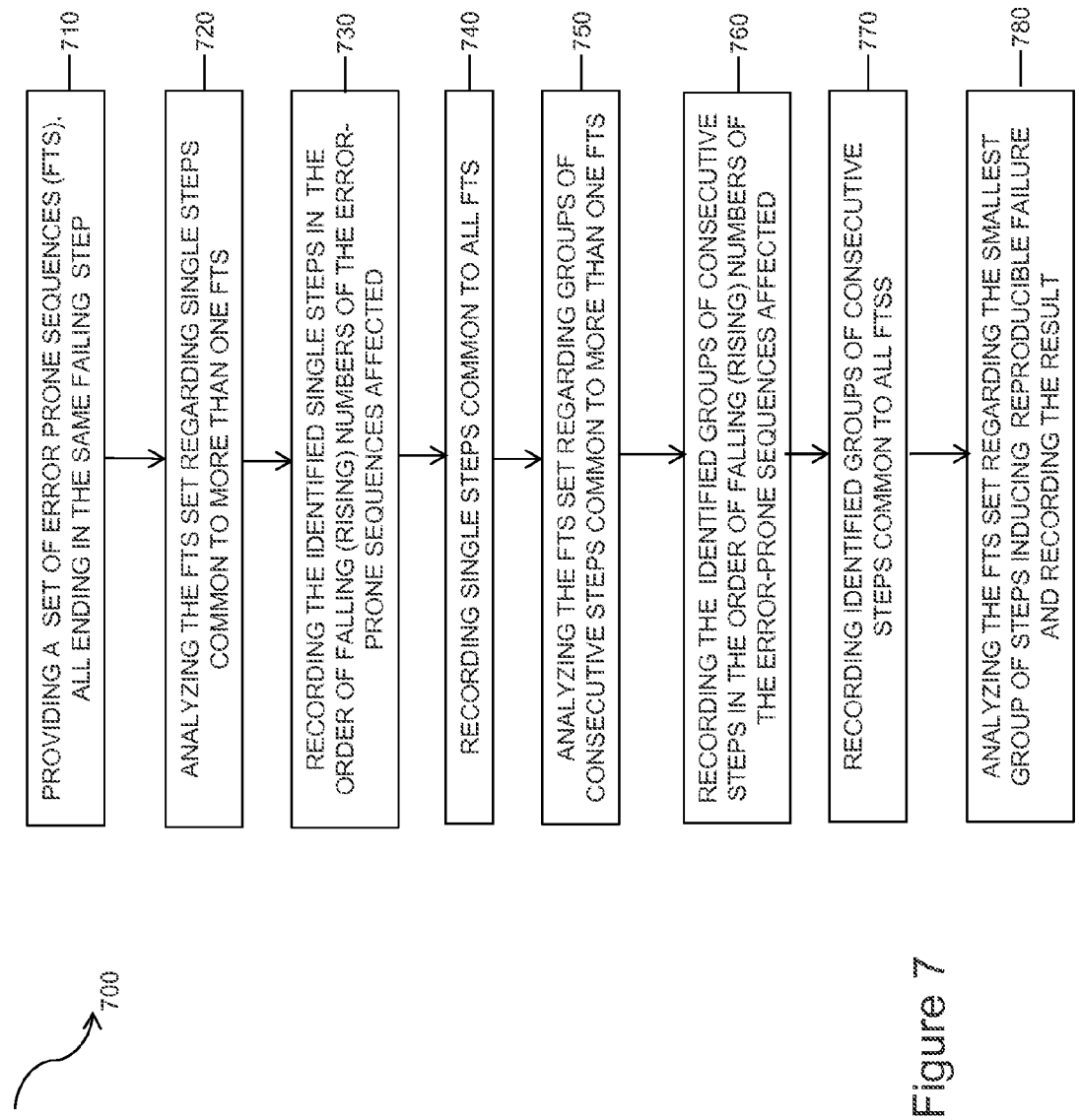
FIG. 7 shows a flowchart of an error analysis program according to an embodiment of the invention, the error analysis program comprises a method for identifying program steps or groups of program steps which are common to a set of failing program step sequences.

The information provided by previously discussed embodiments may be further analyzed in various ways to gain additional insights regarding the root cause(s) of a failure of an error-prone program step (e.g., Step X 250) of a faulty program. Additional analysis instructions are comprised in a further embodiment of yet another analysis method illustrated in a flowchart 700 of FIG. 7.

In step 710 a set of failing sequences (FTS) ending in a same error-prone program step (e.g., Step X 250) is provided. In step 720 the available FTS set is analyzed with respect to a single program step common to all of the FTSs investigated. Alternatively, the available FTS set is analyzed with respect to more than one program step common to all of the FTSs investigated. Moreover, the available FTS set may be analyzed with respect to a subgroup of the FTS set. Subsequently, in step 730, the program steps identified in step 720, are recorded in a first register (e.g., memory) in the order of falling (or alternatively rising) number of error-prone sequences being negatively affected. The number of multi-step sequences negatively affected means how often the FTSs failed for an evaluation runs regarding the identified program step. They are recorded in a second register in step 740 (e.g., memory).

In step 750 the FTS set is analyzed regarding groups of consecutive steps common to all or at least more than one FTS. In step 760 the identified common groups of steps are recorder in a third register (e.g., memory) in the order of falling (or alternatively rising) number of sequences being negatively affected. In step 770, groups of sequences of program steps common to all FTSs are again recorded in a fourth register (e.g., memory).

In a final step 780 the FTS set is analyzed in search of the smallest group of program steps inducing the reproducible failure of the failing step (e.g. Step X 250) and the result is recorded in a fifth register (e.g., memory).

Figure 8:
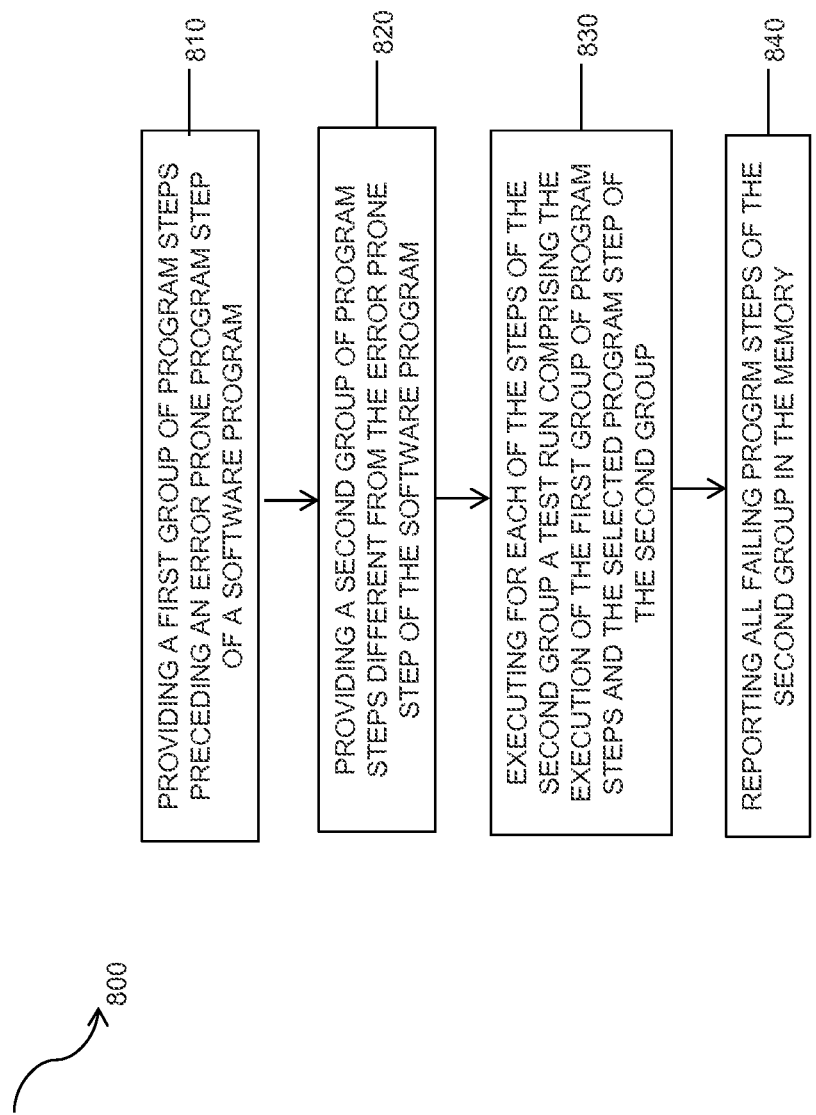
FIG. 8 shows a flowchart of an error analysis program according to an embodiment of the invention, the error analysis program comprises a method for assessing the impact of exchanging the last failing step of a program step sequence with a different program step or different program steps.

For a better understanding of error mechanisms in general it is helpful to know if the group of steps preceding (e.g. Steps 1 210 to Step (X–1) 240) a particular error-prone program step (e.g., Step X 250) within a software program may also cause errors if the error-prone program step is replaced with another step or steps. Such an analysis is enabled by an embodiment of a further evaluation method which is illustrated in a flowchart 800 of FIG. 8.

In an initial step 810 a first group of program steps (e.g., Steps 1 210 to Step (X–1) 240) preceding an error-prone program step (e.g., Step 250) in a software program (e.g., program 200). In step 820, a second group of program steps is provided. The program steps of the second group are different from the error-prone program step (e.g. Step X 250) of the software program. For each of the program steps of the second group an evaluation run is executed, the run comprising the execution of the first group of steps followed by the execution of the selected program step of the second group (step 830). In step 840, all failing steps of the second group of program steps are recorded in a memory (e.g., register 140).

The error analysis methods (e.g., FIGS. 3 and 4) may calculate the reproducibility of failure of an error-prone program step. The error analysis method (FIG. 5) may identify single preceding steps or groups of preceding steps potentially critical for the failure of the error-prone program step. The error analysis method (e.g., FIG. 6) may identify program steps which are not relevant for the software program failure. The error analysis method (e.g., FIG. 7) may identify program steps or a minimal group of consecutive steps that are present in the failing of the error-prone program step or all error-prone program steps. Finally, the error analysis method may provide insight how a set of program steps preceding an error-prone program step of a certain software program may perform for software programs in development.

Figure 6:
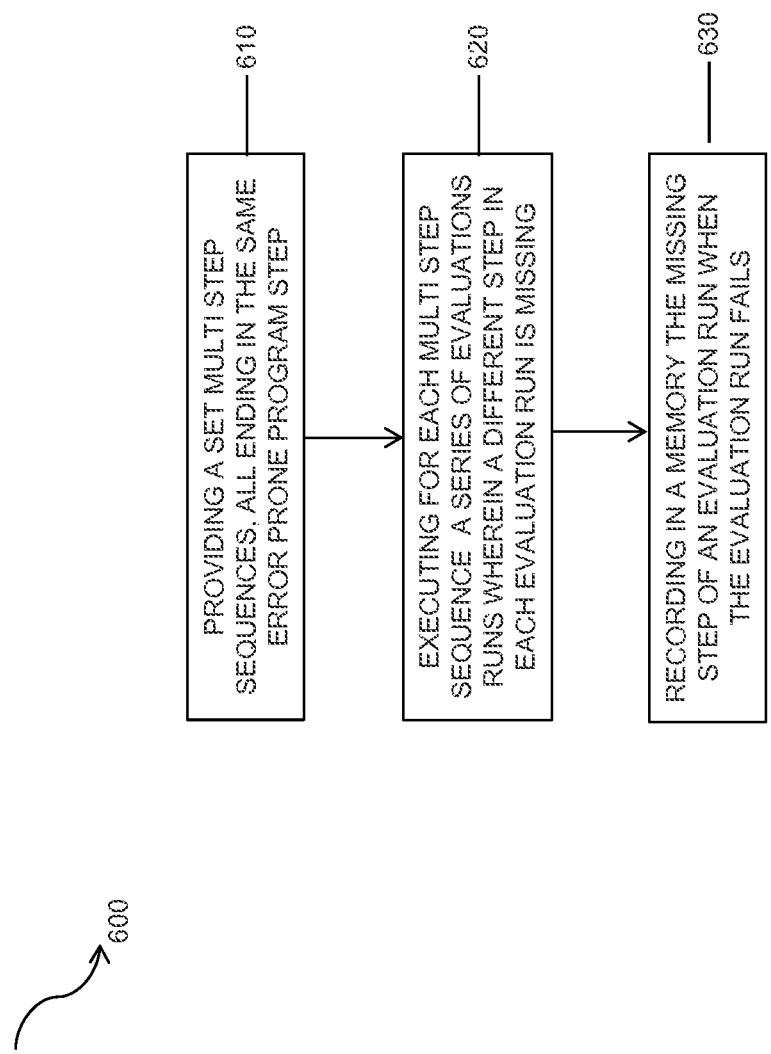
FIG. 6 shows a flowchart of an error analysis program according to an embodiment of the invention, the error analysis program comprises a method for determining which program steps are not relevant to the failure of investigated program step sequences.

In various embodiments the error analysis methods of FIG. 3 and/or FIG. 4 are combined with the error analysis method of FIG. 5 and/or FIG. 6. In various other embodiments the error analysis methods of FIG. 3 and/or FIG. 4 are combined with the error analysis method of FIG. 5 and/or FIG. 6 and FIG. 7 and/or FIG. 8. In some embodiments all error analysis methods are carried out. In other embodiments only one or two error analysis method(s) are carried out.

In summary, the embodiments of the invention should allow a faster tracking and identifying of the root cause(s) of a particular software program failure as compared to a non-software-assisted "best guess" approach.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A machine for investigating an error source in a software program, the machine comprising:
a microprocessor coupled to a memory, wherein the microprocessor is programmed to determine the error source of an error-prone program step by
providing a set of failing sequences all ending in the same error-prone program step;
analyzing the failing sequences regarding a plurality of program steps common to the failing sequences; and
ranking the plurality of program steps according to a failure probability, wherein ranking comprises storing the plurality of program steps in a falling order in the memory.

2. The machine according to claim 1, wherein common to the failing sequences comprises common to all of the failing sequences of the set of failing sequences.

3. The machine according to claim 1, wherein common to the failing sequences comprises common to a subset of the set of failing sequences.

4. The machine according to claim 1, wherein the program steps comprise groups of consecutive steps.

5. A machine for investigating an error source in a software program, the machine comprising:
a microprocessor coupled to a memory, wherein the microprocessor is programmed to determine the error source of an error-prone program step by
providing a first group of program steps preceding an error-prone program step;
providing a second group of program steps different from the error-prone program step;
executing the first group of program steps and a selected program step of the second group of program steps for each program step of the second group of program steps; and
recording failing steps of the second group in the memory.

6. The machine according to claim 5, wherein each of the program steps of the second group of program steps replaces the error-prone program step.

7. A machine for investigating an error source in a software program, the machine comprising:
a microprocessor coupled to a memory, wherein the microprocessor is programmed to determine the error source of an error-prone program step by
providing a set of failing sequences all ending in the same error-prone program step;
analyzing the failing sequences regarding a plurality of program steps common to the failing sequences; and
ranking the plurality of program steps according to a failure probability, wherein ranking comprises storing the plurality of program steps in a rising order in the memory.

8. The machine according to claim 5, wherein executing the first group of program steps and a selected program step of the second group of program steps comprises executing the first group of program steps followed by the selected program step of the second group of program steps.

* * * * *